3,034,879
STABILIZATION OF ORGANIC COMPOSITIONS WITH METAL DEACTIVATORS
Ronald B. Spacht, Kent, Ohio, assignor to The Goodyear Tire & Rubber Company, Akron, Ohio, a corporation of Ohio
No Drawing. Filed June 8, 1959, Ser. No. 818,527
6 Claims. (Cl. 44—71)

The present invention relates to the stabilization of organic substances with metal deactivators. More particularly, it is concerned with the stabilization of organic substances which are subject to oxidative deterioration in the presence of a metal containing material which catalyzes the deterioration by the addition of small amounts of new, highly effective metal deactivators. Although the invention is particularly applicable to the stabilization of natural and synthetic rubbers, the newly discovered metal deactivating properties of the compounds to be fully described hereinafter may be also used to prevent oxidative deterioration of gasoline and other liquid fuels, lubricants, fats and oils, resins and other organic substances.

Many organic substances, and particularly rubber, unsaturated hydrocarbons, fats and oils, and many resins, are subject to the hazard of deterioration due to oxidation. This oxidation, in the case of rubbers, leads to loss of tensile strength, resiliency and other desired properties. Similarly, such oxidative deterioration destroys to a substantial extent many desired properties in other organic substances. The rate of the oxidative deterioration is usually increased when the organic substance is subjected to elevated temperatures or exposed to sunlight or other actinic light. However, a much greater increase in the deterioration is often brought about by the accidental inclusion of extraneous metallic materials in the organic substances. Thus, copper, manganese or iron metal or the salts thereof are inherently catalytic to the oxidation of most organic materials, and very small amounts of these metals or their salts often occur as impurities in organic compositions. Thus, the simple passage of organic compounds through metal pipe or tubing is often sufficient to cause enough metal or metal salt to be accidentally included in the organic composition to catalyze the oxidative deterioration of the composition.

The catalytic effect of metal containing materials upon the oxidative deterioration of organic substances has been recognized for many years. Various expedients have been employed to mitigate the catalytic effect of metal containing materials, and probably the most successful approach to the solution of this problem has been the discovery and use of materials which in some fashion or other serve to deactivate the catalytic effect of the metal containing materials, and accordingly help to stabilize the metal contaminated organic substances against oxidative deterioration. A substantial number of these so-called metal deactivators have been developed and have been described in the technical literature and patents, for example, see U.S. Patents 2,181,121 and 2,533,205. The search continues, however, for additional compounds which can effectively be used as metal deactivators in organic substances, particularly such materials which will be more efficient than the metal deactivators previously known, possess little or no tendency to discolor the organic substances to which they are added, have low toxicity, and have freedom from strong or objectionable odors.

A principal object of the present invention is the provision of new methods for the protection of organic substances against oxidative deterioration which is accelerated by the presence in the substance of small amounts of metal containing materials, particularly, Cu, Mn, Fe metal or salts. Further objects include:

(1) Provision of new means for deactivation of catalytic metals in organic substances to help retard oxidative deterioration of the substances and thereby stabilize them.

(2) The provision of new metal deactivators particularly useful in the stabilization of elastomeric materials, and which produce very little discoloration in white or light colored formulations of the elastomer.

(3) Provision of new and improved metal deactivators for use in inhibiting the deterioration of organic substances in the presence of metallic materials which normally tend to catalyze the oxidative deterioration of the organic substance.

(4) Provision of new compositions comprising an organic substance subject to oxidative deterioration, e.g., natural or synthetic rubber, gasoline, lubricating oils or greases, fuel oils, resins, fats and waxes, contaminated with an oxidation catalyzing metal or metal compound, and new, highly effective metal deactivators for inhibiting the catalytic effect of the metal or metal compounds on the oxidative deterioration.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

These objects are accomplished in accordance with the present invention by the addition of small amounts of disalicylamides to organic compositions so as to act as metal deactivators in the compositions. It has been found that the addition of disalicylamides deactivates or suppresses the effects of contaminating metal components of the compositions, thereby inhibiting the catalytic acceleration of the oxidation deterioration of the organic substances in the compositions.

Normally, the organic composition which is to be protected against oxidative deterioration will include an antioxidant which has the property to retard oxidation naturally occurring, regardless of the presence of the contaminating metal material. However, the efficiency and overall results of such anti-oxidants is seriously retarded by the catalytic activity of the metal component. It has been discovered that the disalicylamides of this invention may be incorporated in organic compositions to permit the anti-oxidant to perform its intended purpose and at the same time to suppress any acceleration in the oxidation of the organic composition caused by the presence therein of the catalytic metal containing material.

The disalicylamides which have been found to be highly effective metal deactivators and usable in accordance with the present invention in the stabilization of organic substances are those having the following structure:

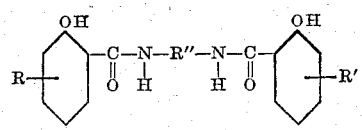

wherein:

R and R' are radicals selected from the group consisting of alkyl, alkoxy, hydrogen and halogen and R'' is a radical selected from the group consisting of
—X— and —X(NH—X)$_n$— wherein X is a 2 to 6 carbon atom alkylene radical and $n$ is a positive integer, particularly an integer from 1 to 12.

The most effective compounds for the purposes of the invention are those in which R and R' are hydrogen, halogen, $C_1$ to $C_6$ alkyl and $C_1$ to $C_6$ alkoxy radicals.

Among the various usable metal deactivators indicated above, specific compounds found to be effective are the alkylene disalicylamides and the alkyl derivatives thereof including ethylene disalicylamide, propylene disalicylamide, isobutylene disalicylamide, hexylene disalicylamide, and $N_1,N_2$-di(2-hydroxy-3-methyl benzoyl) ethylene diamine having the formula:

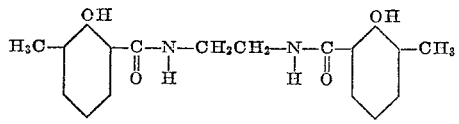

Also, $N_1,N_2$-di(2-hydroxy-3-methyl benzoyl) ethylene diamine; $N_1,N_3$-di(2-hydroxy-3-methyl benzoyl) propylenediamine; $N_1,N_6$-di(2-hydroxy-4-isobutyl benzoyl)hexylenediamine; $N_1$-(2-hydroxy-3-ethyl benzoyl)-$N_2$-(2'hydroxy-4'ethyl benzoyl) ethylenediamine; $N_1$-(2-hydroxy-3-methyl benzoyl) - $N_3$ - (2'hydroxy-5'butyl benzoyl)propylenediamine; $N_1$-(2-hydroxy-3-ethyl benzoyl)-$N_6$-(2'hydroxy-6'amyl)hexylenediamine; $N_1,N_4$-di(2-hydroxy-4-butyl benzoyl) isobutylenediamine; $N_1$-(2-hydroxy-4-hexyl benzoyl)-$N_2$-(2'hydroxy-6'ethyl benzoyl) ethylenediamine; $N_1$-(2-hydroxy-4-dodecyl benzoyl)-$N_2$-(2'hydroxy benzoyl) ethylenediamine; $N_1$-(2-hydroxy-3-ethyl benzoyl)-$N_3$-(2'hydroxy benzoyl) propylenediamine; $N_1$-(2-hydroxy-5-ethyl benzoyl)-$N_2$-(2'hydroxy-5'dodecyl benzoyl) ethylenediamine; $N_1$-(2-hydroxy-4-isopropyl benzoyl) - $N_6$ - (2'hydroxy-6' butylbenzoyl) hexylenediamine, and equivalent compounds.

Additional compounds which are usable as metal deactivators for the achievement of the stabilization of organic substances in accordance with the invention are disalicylamides of polyamines and the alkyl derivatives thereof including $N_1$-3-methyl salicylyl-$N_3$-4-ethyl salicylyl diethylene triamine having the formula:

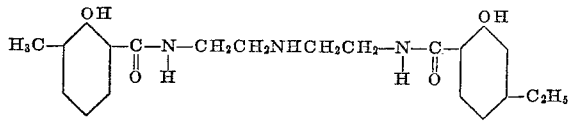

Also, $N_1,N_5$-disalicylyl tetraethylene pentamine; $N_1,N_3$-disalicylyl diethylene triamine; $N_1,N_{13}$-disalicylyl dodecylethylene tridecylamine; $N_1,N_3$-di(3-methyl salicylyl) diethylene triamine; $N_1$-4-ethyl salicylyl-$N_4$-6-butyl salicylyl triethylene tetramine; $N_1,N_3$-disalicylyl diethylene triamine; $N_1$-4-hexylsalicylyl-$N_3$-4-butyl salicylyl diethylene triamine and equivalent compounds.

Also useful are the alkoxy substituted alkylene disalicylamides including $N_1,N_2$-di-(2-hydroxy-3-methoxy benzoyl) ethylenediamine; $N_1$-(2-hydroxy-3-ethoxyl benzoyl)-$N_3$-(2'hydroxy-4'ethoxy benzoyl) propylenediamine; $N_1$-(2-hydroxy-4-methoxy benzoyl)-$N_6$-(2'hydroxy-6'hexoxy benzoyl) hexylenediamine; $N_1,N_4$-di(2-hydroxy-4-butoxy benzoyl) butylenediamine; $N_1$-(2-hydroxy-4-ethoxy benzoyl)-$N_2$-(2'hydroxy benzoyl) ethylenediamine; $N_1$-(2-hydroxy-4-dodecoxy benzoyl)-$N_6$-(2'hydroxy benzoyl) hexylenediamine; $N_1$-(2-hydroxy-3-methoxy benzoyl)-$N_4$-(2'hydroxy benzoyl) butylenediamine and equivalent compounds.

Further useful compounds are the halogen substituted alkylene disalicylamides including $N_1,N_2$-di(2-hydroxy-4-chlorobenzoyl) ethylenediamine; $N_1,N_3$-di(2-hydroxy-3-bromobenzoyl) propylenediamine; $N_1,N_2$-di(2-hydroxy-6-fluorobenzoyl) ethylenediamine; $N_1,N_6$-di(2-hydroxy-4-iodobenzoyl) hexylenediamine; $N_1$-(2-hydroxy-4-chlorobenzoyl)-$N_3$-(2'hydroxy benzoyl) propylenediamine; $N_1$-(2-hydroxy-3-bromobenzoyl)-$N_3$-(2-hydroxy benzoyl)-2-methyl propylenediamine; $N_1$-(2-hydroxy-4-chlorobenzoyl)-$N_2$-(2'hydroxy-6'bromo benzoyl) ethylenediamine and equivalent compounds.

The alkoxy substituted disalicylamides of polyamines are also useful for the purposes of the invention including $N_1,N_3$-di(3-methoxy salicylyl) diethylene triamine; $N_1,N_5$-di(4-ethoxy salicylyl) tetraethylene pentamine; $N_1$-methoxy salicylyl-$N_3$-salicylyl diethylene triamine; $N_1$-4-ethoxy salicylyl-$N_4$-6-butoxy salicylyl triethylene tetramine; $N_1$-isobutoxy salicylyl-$N_3$-6-methoxy salicylyl diethylene triamine and equivalent compounds.

The halogen substituted disalicylamides of polyamines also may be employed as metal deactivators including $N_1,N_3$-di(3-chloro salicylyl) diethylene triamine; $N_1,N_5$-di(4-bromo salicylyl) tetraethylene pentamine; $N_1$-3-chloro salicylyl-$N_4$-5-bromo salicylyl triethylene tetramine; $N_1,N_5$-di(4-fluoro salicylyl) tetraethylene pentamine and equivalent compounds.

Mixed halogen, alkyl and alkoxy substituted alkylene disalicylamides and disalicylamides of polyamines are also useful as metal deactivators. Examples include $N_1$-(2-hydroxy-3-chlorobenzoyl)-$N_2$-(2'hydroxy-4'methyl benzoyl) ethylenediamine; $N_1$ - (2 - hydroxy-3-bromobenzoyl)-$N_3$-(2'hydroxy-3'methoxy benzoyl) propylenediamine; $N_1$-(2-hydroxy-4-methyl benzoyl)-$N_2$-(2'hydroxy - 6'butoxybenzoyl) ethylenediamine; $N_1$-3-methoxy salicylyl-$N_5$-4-methylsalicylyl tetraethylene pentamine; $N_1$-3-methyl salicylyl-$N_3$-3-chlorosalicylyl diethylene triamine; $N_1$-4-ethoxysalicylyl-$N_4$-5-bromosalicylyl triethylene tetramine and equivalent compounds.

In addition to the individual compounds of the type listed above, mixtures of these may be used as metal deactivators in accordance with the invention. Furthermore, mixtures of these compounds with other compatible known metal deactivators in order to obtain special deactivating effects with particular metal impurities or with particular oxidizable organic substances may also be used.

The disalicylamides used as metal deactivators in accordance with the present invention may be prepared in several ways. However, it has been discovered that these compounds may be produced in good yields and without complications by the reaction of phenyl salicylate or the alkyl alkoxy or halo-substituted forms of this compound with an alkylene diamine or a polyalkylene polyamine.

EXAMPLES

A more complete understanding of the novel compositions of matter and their method of preparation may be had by reference to the following examples, in which all parts or percentages are by weight unless otherwise specified.

*Example 1*

There are mixed together in a suitable reaction vessel equipped with external heat-exchange coils to heat or cool the vessel, 54 parts of salol and 24 parts of tetraethylene pentamine. The vessel and its contents are then slowly warmed up to about 50° C., which causes an immediate exothermic reaction to take place. Thereafter, reaction heat is withdrawn from the reaction mixture to maintain the temperature at 100° C. for one hour. The phenol produced as a reaction product is then removed by vacuum distillation to leave as a residue in the reaction vessel the desired reaction product. This is then removed from the vessel and is found to be a light brown, resinous solid with a melting point of 77–90° C., consisting principally of $N_1,N_5$-disalicylyl tetraethylene pentamine and the yield is about 90% of theory.

*Example 2*

There are mixed in a reaction vessel similar to that used in Example 1, 54 parts of salol and 12 parts of a commercial form of propylene diamine containing about 80% of the diamine. This mixture is heated to 120° C. and allowed to react at this temperature for one hour. Then, the reaction mixture is subjected to vacuum distillation to remove water and phenol formed as reaction products, after which the desired reaction product is recovered from the reaction vessel.

A clear, resinous solid product having a melting point of 70–85° C. and consisting principally of propylene disalicylamide is obtained in almost quantitative yield.

Example 3

A solution is formed by dissolving 500 parts of butadiene-styrene rubber (SBR-1006) in 5000 parts of benzene and then further dissolving therein the following ingredients:

| | Parts |
|---|---|
| Styrenated phenol rubber anti-oxidants "Wing-Stay S" (sold by Goodyear Tire and Rubber Company) | 6 |
| Ferric stearate | 0.015 |

The resulting solution is divided into five equal portions, and one of these is poured onto and allowed to flow out on a sheet of aluminum foil. The benzene is then evaporated at room temperature from the thin film of solution, forming a thin layer of unvulcanized rubber composition. This thin layer is next stripped from the aluminum foil and several small, rectangular samples are cut from the stripped film. After being weighed, the samples are placed in an oxygen absorption apparatus and tested for oxygen absorption at 90° C., in accordance with the standardized test reported at "Industrial and Engineering Chemistry," vol. 38, p. 71 (1946).

Example 4

There is dissolved in the second of the five equal portions of rubber solution of Example 3, one part of the product of Example 1. Rectangular samples of rubber film from the resulting solution are prepared and tested for oxygen absorption, following the procedure of Example 3.

Example 5

The operations of Example 4 are repeated using one part of the product of Example 2 in place of the product of Example 1 and the third of the five solution portions from Example 3.

Example 6

The operations of Example 4 are repeated with the fourth of the solution portions from Example 3 and one part of mercapto benzimidazole (a commercially available metal deactivator) in place of the reaction product of Example 1.

Example 7

The operations of Example 4 are repeated with the last of the solution portions and two parts of disalicylal propylene diamine (a commercially available metal deactivator) in place of the reaction product of Example 1.

The average oxygen absorption values of the samples prepared and tested in each of the Examples 3 to 7 are reported in the following table:

TABLE I

| Product of Example | Hours to 2% oxygen | Percent Improvement |
|---|---|---|
| 3 | 14 | — |
| 4 | 224 | 1,600 |
| 5 | 88 | 530 |
| 6 | 22 | 57 |
| 7 | 32 | 129 |

Example 8

A standard white-sidewall rubber formulation usable in the production of white-sidewall pneumatic tires is prepared comprising 0.5% based upon the total weight of the composition of the reaction product of Example 1. The resulting composition is extruded into a standard test strip and is then aged for 48 hours in a weatherometer, and for twenty days under standard outdoor roof exposure conditions. Substantially no discoloration of the white-sidewall composition is noted in either the samples aged in the weatherometer or those aged under the outdoor exposure conditions.

In another case, a white-sidewall formulation is prepared incorporating 1% of the metal deactivator reaction product of Example 1. Substantially the same results are obtained upon aging in the weatherometer and under outdoor exposure conditions as are noted in the formulation containing 0.5% of the metal deactivator.

Example 9

A sample of a Pennsylvania thermally cracked gasoline is subjected to a standard oxygen bomb stability test (SAEJ, 24, 584, 1929) and the results are reported in accordance with the test as the induction period in minutes, namely 100 minutes.

To another sample of the same gasoline, there is added 0.01% of a gum inhibitor comprising 80% of N-n-butyl-4-amino-phenol and 20% of N-N'-dibutyl-4-phenylene diamine. This inhibited gasoline is then subjected to the same stability test and found to possess an induction period of 580 minutes. With 2 p.p.m. of copper added to the inhibited gasoline, the induction period is found to be 170 minutes.

To another sample of the inhibited gasoline containing 2 p.p.m. of copper, 0.0005% of the metal deactivator produced in Example 2 is added to the gasoline mixture, and the resulting product is then subjected to the same stability test. In this case, the treated gasoline is found to have an induction period of 415 minutes.

As demonstrated by the above examples, the new metal deactivators of this invention are particularly useful in stabilizing synthetic rubber of the butadiene-styrene type. However, the new metal deactivators have been found to be useful in stabilizing all other types of elastomeric diene polymers, including natural rubber, butyl rubbers, acrylonitrile-butadiene polymers, polychloroprenes, as well as other elastomeric polymers, including acrylic ester polymers, vinyl ester elastomers and comparable polymeric materials whose oxidative deterioration is accelerated by presence therein of heavy metals or their compounds, particularly Cu, Co, Mn or Fe.

In addition to stabilization of rubbers as above indicated, the new metal deactivators appear to be useful in stabilizing all other forms of organic substances which are subject to metal accelerated oxidative deterioration. Aside from cracked gasoline as above reported, they may be used with hydrocarbon lubricants, vegetable and animal fats and oils, proteins, plasticizers or the like. The deactivators function in solutions of the organic substances as well as in undiluted mixtures.

The new metal deactivators may be incorporated in the organic substances in any suitable manner. The amount needed is very small and will depend to some extent upon the material being stabilized and the amount of contaminating heavy metal compound in the material. With natural and synthetic rubber, the deactivator will be used in about 0.05 to 5 parts per 100 parts of rubber. With gasoline, 5 to 50 p.p.m. are effective. Simple tests will indicate the effective amount to be used in stabilization of any organic composition in question. Generally ten times the weight of deactivator is used per unit weight of contaminating metal in the organic substance to be stabilized.

Normally, the new metal deactivators will be used in conjunction with small amounts of other stabilizing or preserving agents, e.g., anti-oxidants, gum inhibitors or the like. The above examples illustrate this with use of anti-oxidants in rubber compositions and gum inhibitors in gasoline mixtures. Typical augmenting materials include hindered phenols, both monohydric and polyhydric, e.g., dibutyl cresol, bisphenols, butylated octyl phenols; diphenyl amines, e.g., p-isopropoxy diphenylamine; octylated diphenylamines; polyalkyl polyphenols; monoethers of hydroquinone, e.g., hydroquinone monobenzyl ether; p-phenylene diamines, e.g., diphenyl p-phenylene diamine, di-secondary butyl phenylene diamine, di-β-naphthyl-p-phenylene diamine; alkylated phenols; aminophenols, e.g., N-butyl-4-aminophenol, N-methyl-2-dodecyl-4-aminophenol; naphthylamines, e.g., phenyl-β-naphthylamine, aldol-α-naphthylamine; alkyl or aryl phosphites, e.g., tri(p-nonyl phenyl) phosphite, and similar anti-oxidants, gum inhibitors or the like will known to the art. Furthermore, the new metal deactivators may be used in combination, if desired, with any other known metal deactivators, such as those disclosed in the aforementioned U.S. patents. Usually, the supplemental agents will be employed in an amount between 0.0001 and 10 parts per 100 parts of organic substance to be stabilized, e.g., in rubber compositions between about 0.5 and 5% by weight of anti-oxidant will be used with 0.05 to 5% of the metal deactivator.

Having provided a complete description of the invention in such manner as to distinguish it from other inventions and from what is old, and having provided a description of the best mode contemplated of carrying out the invention, the scope of patent protection to be granted the invention is defined by the following claims.

I claim:
1. An organic material which is subject to oxidative deterioration in the presence of a metal containing material which catalyzes said deterioration selected from the group consisting of rubber and gasoline containing a small amount sufficient to stabilize said material of a metal deactivator having the structure:

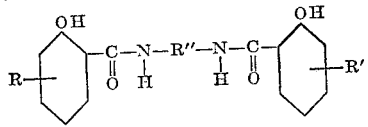

wherein R and R' are radicals selected from the group consisting of alkyl, alkoxy, hydrogen and halogen and R'' is a radical selected from the group consisting of —X— and —X(NH—X)$_n$— and wherein X is a 2 to 6 carbon alkylene radical and $n$ is a positive integer from 1 to 12.

2. An organic material which is subject to oxidative deterioration in the presence of a metal containing material which catalyzes said deterioration selected from the group consisting of rubber and gasoline containing a small amount sufficient to stabilize said material of a metal deactivator having the structure:

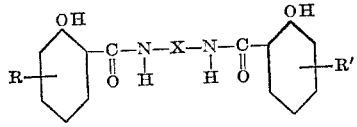

wherein R and R' are radicals selected from the group consisting of $C_1$ to $C_6$ alkyl, $C_1$ to $C_6$ alkoxy, hydrogen and halogen, and X is a 2 to 6 carbon alkylene radical.

3. An organic material which is subject to oxidative deterioration in the presence of a metal containing material which catalyzes said deterioration selected from the group consisting of rubber and gasoline containing a small amount sufficient to stabilize said material of a metal deactivator having the structure:

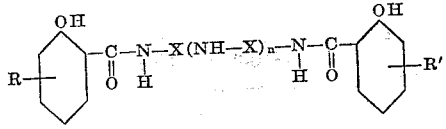

wherein R and R' are radicals selected from the group consisting of $C_1$ to $C_6$ alkyl, $C_1$ to $C_6$ alkoxy, hydrogen and halogen, X is a 2 to 6 carbon atom alkylene radical and $n$ is a positive integer from 1 to 12.

4. Rubber containing a metal salt which catalyzes oxidative deterioration of said rubber and as a metal deactivator to inhibit the catalytic deterioration effect of said metal salt, between 0.05 and 5 percent by weight of propylene disalicylamide.

5. Rubber containing a metal salt which catalyzes oxidative deterioration of said rubber and as a metal deactivator to inhibit the catalytic deterioration effect of said metal salt, between about 0.05 and 5 percent by weight of $N_1,N_5$-disalicylyl tetraethylene pentamine.

6. Gasoline containing between about 5 and 50 p.p.m. of a metal deactivator having a structure as defined in claim 1.

References Cited in the file of this patent
UNITED STATES PATENTS

| | | |
|---|---|---|
| 876,179 | Heinrici | Jan. 7, 1908 |
| 1,899,856 | Montmollin et al. | Feb. 28, 1933 |
| 2,070,304 | Jaeger | Feb. 9, 1937 |
| 2,190,829 | Graves | Feb. 20, 1937 |
| 2,379,978 | Meyer | July 10, 1945 |
| 2,420,122 | Chenicek | May 6, 1947 |
| 2,598,213 | Blair | May 27, 1952 |
| 2,683,132 | Young et al. | July 6, 1954 |
| 2,848,418 | Muller et al. | Aug. 19, 1958 |
| 2,921,048 | Bell et al. | Jan. 12, 1960 |

FOREIGN PATENTS

| | | |
|---|---|---|
| 423,938 | Great Britain | Feb. 11, 1935 |

OTHER REFERENCES

Pharmacological Reviews, vol. 8, 1956, "Chelation as a Mechanism of Pharmacological Action," by Chenoweth, pp. 57–63.

Chemistry of Metal Chelate Compounds, by Martell and Calvin, 1952, Prentice-Hall Inc., page 136.

UNITED STATES PATENT OFFICE
CERTIFICATE OF CORRECTION

Patent No. 3,034,879                      May 15, 1962

Ronald B. Spacht

It is hereby certified that error appears in the above numbered patent requiring correction and that the said Letters Patent should read as corrected below.

Column 3, line 43, for "$N_1,N_{13}$-disalicylyl" read -- $N_1,N_3$-disalicylyl --; column 7, line 5, for "will" read -- well --; column 8, line 21, after "between" insert -- about --.

Signed and sealed this 18th day of June 1963.

(SEAL)
Attest:

ERNEST W. SWIDER
Attesting Officer

DAVID L. LADD
Commissioner of Patents